Patented Feb. 26, 1929.

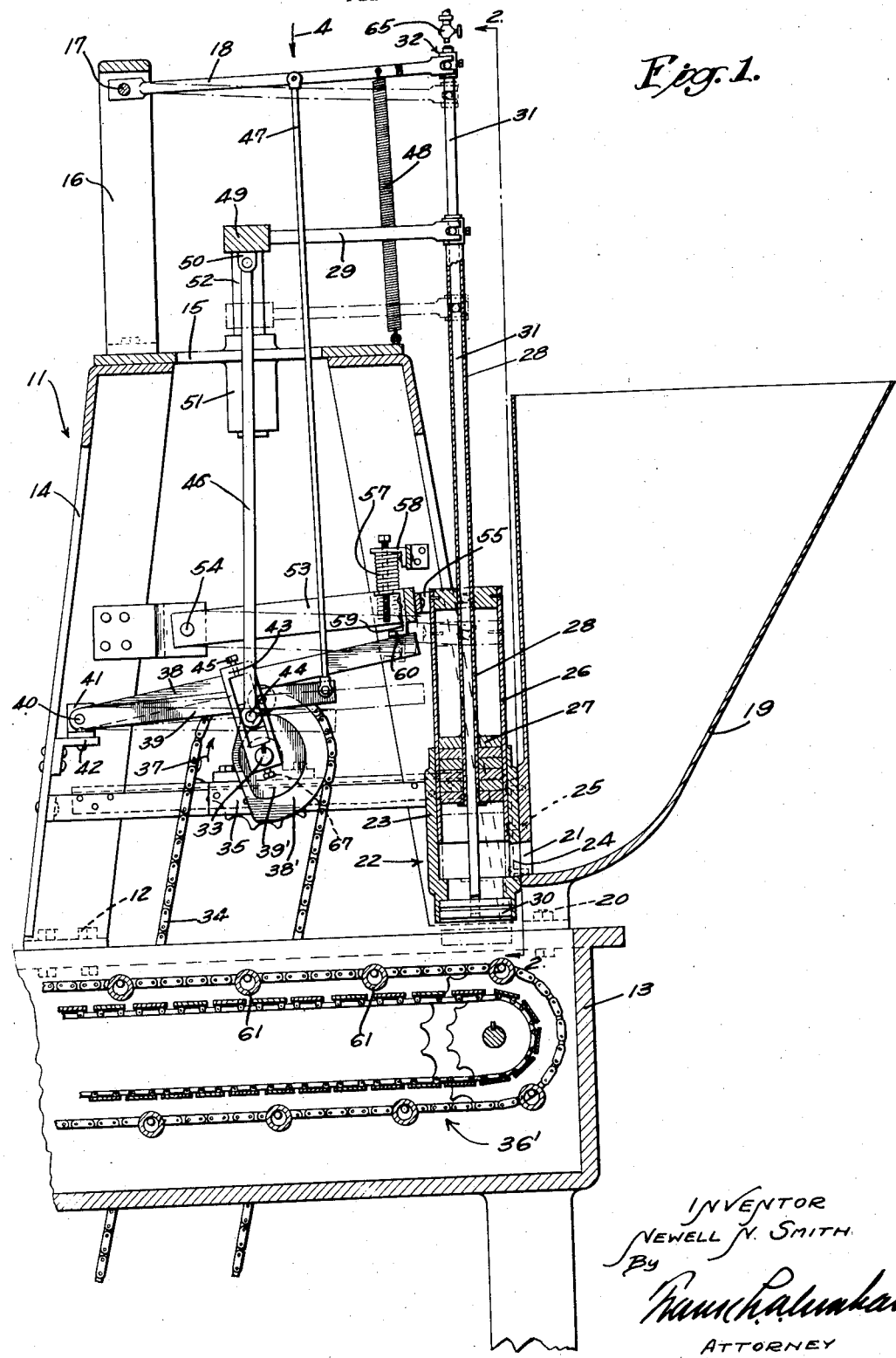

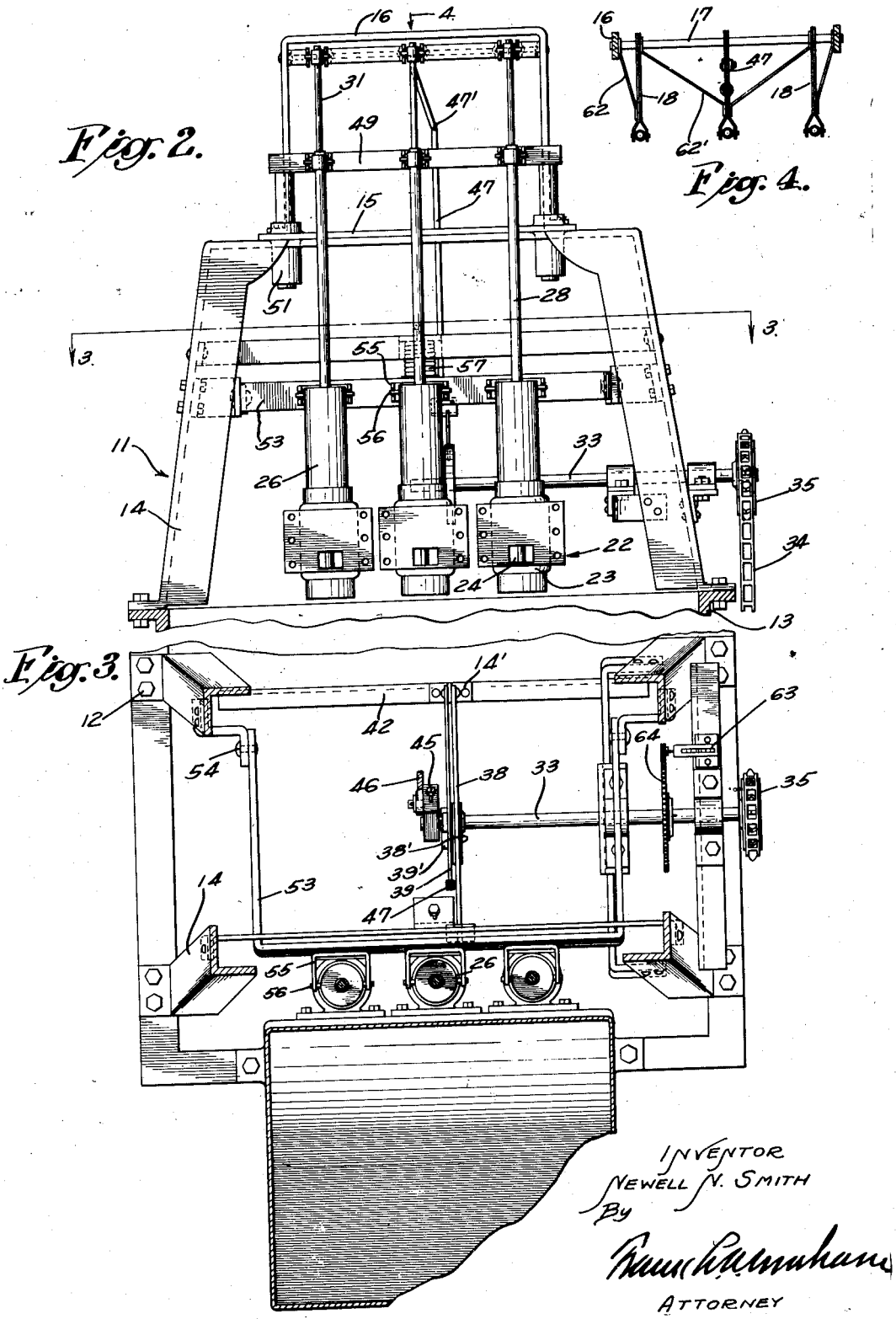

1,703,434

UNITED STATES PATENT OFFICE.

NEWELL N. SMITH, OF LOS ANGELES, CALIFORNIA, ASSIGNOR TO DAVIS STANDARD BREAD COMPANY, A CORPORATION OF CALIFORNIA.

DOUGHNUT SHAPING AND FEEDING MACHINE.

Application filed January 22, 1927. Serial No. 162,718.

As may be inferred from the above title, this invention relates to means for producing annular rings from a suitable dough; and, in preferred embodiments of my invention, my shaping and feeding machine may be provided with means for its support at or near one end of a vat,—into which the shaped units may be automatically fed, by mere dropping, as the same are formed.

It is an object of this invention to provide a doughnut shaping device which is entirely suitable for use in connection with a heated grease vat and doughnut handling organization such as are described in my recent Patent No. 1,605,476, granted November 2, 1926; but it should be understood that the principles of my present invention are applicable to the shaping and feeding of any desired annular or like products formed from a suitable doughnut dough, or the like, regardless of the specific character of the cooking or baking organization that may be used therewith.

It is a further object of my invention to provide adjacent a suitable hopper, a dough chamber which is so constructed that its volume undergoes cyclical changes,—these changes being duly synchronized with reference to the opening of an inlet gate thereto, from said hopper, and with reference to the opening of an outlet gate therefrom; and, in the preferred embodiments of my invention, the last mentioned gate may be circular in outline and adapted to serve not only as a closure but as a shaping element.

Specifically it is an object of my invention to provide, adjacent a suitable hopper and above a cooking vat, a dough chamber which comprises concentric cylindrical elements and a vertically reciprocable plunger,—one of said cylindrical elements being adapted to serve as an inlet gate and said plunger being adapted to serve not only as a movable wall, to vary the capacity of said dough chamber, but also to provide guidance for an upwardly extending rod by which the mentioned outlet gate is manipulable,—all of the last mentioned elements being concentrically disposed and so operated as simultaneously to shape and to deliver any desired number of doughnuts, or the like.

It is a further object of my invention to provide, for use in connection with the mentioned parts, power transmission means including cams and/or cranks and/or arms and/or levers, for imparting motion thereto from a single shaft: and this shaft may be so mounted, upon a horizontal axis, as to render the same conveniently rotatable by a sprocket chain, or the like, extending toward a drive shaft such as is shown and described in my mentioned patent as employed in imparting translatory and turning movements to doughnuts, during the cooking of the same.

Other objects of my invention, including preferred details of frame construction and mechanical connection and resilient returning means, may be best appreciated from the following description of illustrative embodiments of my invention, taken in connection with the appended claims and the accompanying drawings, in which Fig. 1 may be referred to as a longitudinal vertical section in a substantially median plane.

Fig. 2 is an elevational view, with a hopper eliminated, taken substantially as indicated by the line 2—2 of Fig. 1.

Fig. 3 is a horizontal sectional view taken substantially as indicated by the line 3—3 of Fig. 2.

Fig. 4 is a diagrammatic detail view, taken substantially as indicated by the arrow 4 of Fig. 1, but showing merely a preferred method of interconnecting and bracing an uppermost set of levers hereinafter described.

Referring to the details of that specific embodiment of my invention chosen for purposes of illustration, 11 being a pyramidal or other frame adapted to be rigidly secured, as by bolts 12, to a cooking vat 13, or its equivalent, this frame may comprise, additional to inclined angle members 14, an apertured top plate 15; and this may be, in turn, surmounted by an inverted U-frame 16,—through which may extend a shaft 17, for the pivotal support of members such as outlet operating levers 18 hereinafter described; at the extreme end of the vat 13 I show a hopper 19 as secured by bolts 20 and as provided with lateral outlets 21, for doughnut dough, or the like; and opposite the opening or openings 21 I may secure a dough chamber organization or organizations 22 of any preferred character.

For example, securing an outer and fixed cylindrical element 23, having an inlet opening 24, to the hopper 19 (as, by means of bolts or screws 25) I may provide, within the outer cylindrical member 23, an inlet gate member in the form of an inner and movable cylinder 26,—the latter being in turn adapted to receive an additional movable-wall element such as a plunger 27, hereinafter designated as the upper plunger.

The upper plunger 27 is shown as carried by a tubular sleeve 28, which may be reciprocable by means such as a horizontal arm 29; I show the lower end of the outer cylinder 23 as adapted to receive an outlet gate 30, which I may term an outlet or lower plunger,—capable, upon reciprocation, of serving as a shaping element to produce annular rings; and this gate member may be connected, in each case, by a rod 31, extending through a sleeve 28, with one of the mentioned levers 18,—and as by a pin-and-slot connection at 32.

To impart suitably timed movements to each plunger 27, or its equivalent, (whose rise is intended to exert a "suction", drawing dough through the inlet opening 24) and to the gate members 26 and 30, or their equivalents, I may employ means such as suitable cams and cranks upon a shaft 33, and levers and links such as are shown thereabove. For example, the shaft 33 being rotated by a sprocket chain 34 (extending between a sprocket 35 on the shaft 33 and a corresponding sprocket, not shown, on a main drive shaft by which a doughnut handling organization 36' advances doughnuts within the vat 13) assuming the sprocket wheel 35 to rotate in the direction indicated by the arrows 37, pivoting both an inlet control lever 38 and an outlet control lever 39 upon a short shaft 40 (shown as extending through brackets 41 upon a shelf 42), and providing the shaft 33 also with a crank 43 (whose pin 44 may be radially adjustable by means such as a screw 45) I may employ means such as a pitman 46 to reciprocate the arm 29, governing the position of the plunger 27; I may connect the outlet control lever 39 with gate-opening levers 18 by means such as a push rod or rods 47 (shown as opposed by a tension spring 48); and I may impart suitably timed oscillations to the levers 38 and 39 by means such as cams 38' and 39', carried by the shaft 33.

The plunger-operating arm or arms 29 may project from a horizontal member 49, to which the upper end of the pitman 46 may be secured by means such as a pivot bracket or lug 50; the horizontality of the arms 29 may be assured by the use of means such as guides 51, shown as carried by the plate 15 and as adapted slidably to receive vertical cylindrical members 52, projecting downwardly from the horizontal member 49; and the movable cylindrical elements 26, comprised in the described dough chamber and serving as inlet gate members therefor, may be rendered responsive to movements of the inlet lever 38, or its equivalent by, for example, the interposition of means such as a cammed arm 53,—shown as pivoted at 54, as connected with the cylinders 26 by brackets 55, having pin-and-slot connections with said cylinders at 56, and as resiliently pressed downward by a compression spring 57. The spring last referred to is shown as confined between a fixed bracket 58 and a cooperating bracket 59 which is secured upon the outer end of the cammed bar 53 and may be integral with a cam shoe 60, slidably engageable by the outer end of the inlet control lever 38.

In the operation of a doughnut shaping and feeding organization of the general character described, it being understood that three or another suitable number of doughnuts may be simultaneously formed and dropped, in a transversely extending row, during each cycle of movements produced by a revolution of shaft 33, and that one row of doughnuts may advantageously be automatically dropped, in the indicated manner, in front of each of the advancing transverse members 61 (with which other parts are presumably associated somewhat as described in my mentioned patent) the hopper 19 being kept supplied with a suitable dough, the crank arm 43 may be of such length and so positioned upon the shaft 33 as to assure descent of the upper plungers 27, through a predetermined distance dependent upon the intended size of the doughnuts, after the inlet opening 24 is closed by descent of the movable cylindrical member 26, the outlet gate or lower plunger 30 being then open; but the upward retraction of the upper plunger 27 will be understood to occur subsequently to the enclosing of the outlet opening and subsequently to the elevation of said movable cylindrical member,—in order that the rise of the upper plunger shall be effective to draw a predetermined quantity of dough into the corresponding dough chamber, in readiness for a repetition of the described movements.

It will be seen that, although the reciprocation of the upper plunger 27 is effected by positive means, in the case of the other movable parts disposed concentrically therewith, only a retractive or upward movement is positively effected,—the suitably timed descending movements of the movable cylindrical members 26, (serving as inlet gates) and the descending movements of the lower plunger or outlet gates 30 (serving also as shaping members) being respectively effected by resilient means in the form of a compression spring (57) and a tension spring (58); and I consider my indicated use of resilient means as preferable except when unusually stiff dough is to be shaped.

In Fig. 4 I show an advantageous method of interconnecting lower plunger or outlet gate operating levers 18,—steadied by diagonal braces 62, 62'; in Fig. 3 I show a counter 63 as operable by a gear 64 upon the shaft 33; in Fig. 2 I show the push rod 47 as provided with bend at 47'; and in Fig. 1 I show a cock 65, through which may be fed an edible oil having lubricating qualities, as disposed above each rod 31 in such manner that a moderate flow of oil down those rods and between cylindrical surfaces (provided not only by the said rod and the sleeve 28 but also by the cylinders 23 and 26) may be effective not only to produce a sealing effect and obviate friction between the mentioned relatively movable parts but also to lubricate the interior of the dough chambers 22, to prevent sticking of dough therein.

It will be obvious that the respective cams 38' and 39' may comprise "proud" portions of any desired length and angular relationship; and that the crank arm 43 may be secured to the shaft 33 (as by a set screw 67) in any desired angular relationship thereto, and may be given a throw dependent upon the intended size of the product desired.

Although I have herein described a single complete embodiment of my invention, it should however be understood not only that various features of this invention may be independently employed but also that numerous modifications of the same might easily be devised, by those skilled in the arts to which this case relates, without the slightest departure from the spirit and scope of said invention, as the same is indicated above and in the following claims.

I claim as my invention:

1. In a doughnut machine: a dough hopper; a dough chamber provided with an inlet which communicates with said hopper through a lateral opening gate means for closing said lateral opening, said chamber being provided also with a bottom outlet opening; and a plunger member disposed in said outlet opening and adapted to reciprocate relatively thereto,—said outlet plunger member being movable by means comprising a rod which upwardly projects from said dough chamber.

2. In a doughnut machine: a dough hopper; a dough chamber provided with an inlet which communicates with said hopper through a lateral opening gate means for closing said lateral opening, said chamber being provided also with a bottom outlet passage; and a lower plunger member slidably disposed in said outlet passage and adapted to reciprocate relatively thereto.

3. In a doughnut machine: a dough hopper; a dough chamber provided with an inlet which communicates with said hopper through a lateral opening gate means for closing said lateral opening, said chamber being provided also with a bottom outlet opening; and a lower plunger member disposed in said outlet opening and adapted to reciprocate relatively thereto,—said dough chamber comprising an upper plunger which is movable by means comprising a tubular member through which extends a lower plunger-operating rod.

4. In a doughnut machine: a dough chamber provided with means for varying the capacity thereof and with a reciprocable outlet plunger member adapted to cooperate with an outlet passage and opening in shaping and cutting an annulus at each relative reciprocation of said outlet plunger member.

5. In a doughnut machine: a dough chamber provided with means for varying the capacity thereof and with a reciprocable outlet plunger member adapted to cooperate with an outlet opening in shaping an annulus at each relative reciprocation of said outlet plunger member,—said dough chamber comprising relatively movable parts which are concentrically disposed; and means, comprising an outlet control lever, an outlet plunger-operating lever and a rod therebetween, for manipulating said outlet plunger.

6. In a doughnut machine: a dough chamber having an inlet opening and a substantially cylindrical outlet passage; means for delivering dough into said chamber through said inlet opening; means for forcing dough from said chamber through said outlet passage; a plunger member reciprocably mounted in sliding contact with said outlet passage; and means for projecting said plunger from said passage.

In testimony whereof, I have hereunto set my hand at Los Angeles, California, this 13th day of January, 1927.

NEWELL N. SMITH.